US005913017A

United States Patent [19]

Kienhofer et al.

[11] Patent Number: 5,913,017

[45] Date of Patent: Jun. 15, 1999

[54] CONTROL DEVICE FOR A PRINTING MACHINE

[75] Inventors: Jurgen Kienhofer, Muhlheim; Dieter Duschl, Offenbach, both of Germany

[73] Assignee: MAN Roland Druckmaschinen AG, Germany

[21] Appl. No.: 08/729,176

[22] Filed: Oct. 11, 1996

[30] Foreign Application Priority Data

Oct. 12, 1995 [DE] Germany ............................ 195 37 933

[51] Int. Cl.[6] ............................ B41B 15/00; G09G 5/00; G09G 5/08; G06F 19/00

[52] U.S. Cl. .......................... 395/114; 395/114; 345/184; 345/161; 364/468.24

[58] Field of Search ............................ 395/114; 345/184, 345/161; 364/468.24

[56] References Cited

U.S. PATENT DOCUMENTS

| | | | |
|---|---|---|---|
| 5,091,859 | 2/1992 | Zingher et al. . | |
| 5,440,325 | 8/1995 | Edmark, III | 345/184 |

FOREIGN PATENT DOCUMENTS

| | | |
|---|---|---|
| 38 29 342 A1 | 3/1990 | Germany . |
| 39 06 585 A1 | 9/1990 | Germany . |
| 36 14 406 C2 | 1/1991 | Germany . |

*Primary Examiner*—Edward L. Coles
*Assistant Examiner*—Twyler Lamb
*Attorney, Agent, or Firm*—Leydig, Voit & Mayer, Ltd.

[57] ABSTRACT

A control device for a printing machine is described, in particular a sheet-fed offset press, having a movable operating element and a device which senses the movements thereof, as well as a downstream electronic valuation system. Such already known control devices, which are equipped with a rollerball, joystick or mouse as operating element, are to be improved with regard to ergonomic operability. This is achieved according to the invention by designing the operating element as a wheel mounted capable of rotating about an axis. The movement of this wheel is sensed by an electronic evaluation system, and highlights selectable menu items in accordance with a prescribed sequence on a display device. After the desired menu item has been marked by rotating the wheel forward or backward, the desired function is initiated by actuating a command initiation key.

4 Claims, 4 Drawing Sheets

CONTROL DEVICE FOR A PRINTING MACHINE

TECHNICAL FIELD

The invention relates to a control device for printing machines, and in particular, to a control device that that can be efficiently used by an operator wearing printing gloves and working on an inclined working surface.

BACKGROUND OF THE INVENTION

The control of printing machines and the monitoring of the printing processes running thereon are increasingly being undertaken from central control consoles. These central control consoles are composed of a number of operating elements and at least one planar display device on which information can be represented. As a rule, the operating elements are an alphanumeric keyboard with cursor control keys for the direct entry of data or numerical values. Of particular importance to this invention is the use of control menus in which printing machine settings can be monitored and adjusted, and other information about the printing process can be recalled upon command. Performing these tasks has been inefficient and accomplished through repetitive operator action. Conventionally, menu-driven user interfaces have a specific number of menu items always represented on the display device. Using cursor control keys to highlight one or more of menu items, an operator initiates a command via the actuation of a special input key. Additional selections under a menu item and other menus can be called up and selected in an analogous way.

Other implementations of menu interfaces for printing machine control systems frequently use function keys to select and initiate commands. The use of a high number of function keys causes lack of clarity and harbors the risk of operator error. Similarly, recalling information or selecting and initiating commands via cursor control keys is prone to operator errors.

Control devices for printing machines sometimes have a rotating control device that operates in two dimensions, for example, in German Patent No. DE 3 614 406 C2. In this patent, a control device of a rotary offset machine includes a digitizer in the form of a control ball operable in two dimensions. Rotating this control ball in the X-axis calls up for adjustment the actuators of the ink film thickness profile, the actuators of the damping solution thickness profile, or another register. Subsequent actuation of the control ball in the Y-direction then causes incremental adjustment of the called actuator or register. One main disadvantage of such a control ball or equivalent results from the activation of different sets of commands based on the direction of movement of the control ball. This allows commands to-be inadvertently activated by erroneous movement of the control ball in one direction when attempting to move the control ball only in a single, different direction. In practice, an operator must limit movements of the control ball to a single direction. The operator therefore carries out operating actions with a heightened level of attentiveness which leads to unnecessary strain and is unnecessarily inefficient.

The disadvantages named above also arise in the use of a two-dimensionally operated control device to select menu items from a display console. For example, in Zingher et al. U.S. Pat. No. 5,091,859, issued Feb. 25, 1992, a printing plant control system uses a rollerball to control commands. This patent describes a control system with menu guidance provided to the operator by means of command cycles which can be called up. A rollerball, which can be moved in two dimensions, is assigned a data release key which is used to initiate a command that is called up and highlighted on the display device. The use of the rollerball in the printing control system operator interface has many disadvantages including its two dimensional operation of the rollerball, being difficult to use, and its tendency to promote errors by the printing machine operators who are typically wearing gloves.

Machine control units composed of a personal computer with a mouse that can be moved through a horizontal plane are also known. The disadvantages of the two dimensional operation and difficulty of use by printing machine operators as described above also are inherent in the use of a mouse control device. Furthermore, the operating consoles of printing machines generally have inclined working surfaces for the purpose of assessing the print copies. A mouse control device is difficult to use on an inclined work surface, and is prone to cause errors as gravity causes the mouse to move on its own. Thus, it is necessary to find a parking surface on the inclined working surface for on which the mouse can be placed.

The control devices described above do not provide the printing machine operator an effective means to control the operation of a printing machine. These prior devices require inefficient, time-consuming, and extraneous efforts for error-free control of the printing machine.

SUMMARY OF THE INVENTION

The primary object of the present invention is to provide a menu-driven user interface to a control device for a printing machine that can be easily, rapidly and reliably operated without the dexterity required of the prior art devices, thus avoiding the disadvantages described above.

Yet another object of this invention is to provide a control device that can be used by a printing machine operator wearing gloves and working from an inclined working surface.

To these ends, according to the primary aspect of the invention, a controller for a printing machine is responsive to an operating element mounted for rotation about a single axis, where the operating element is a wheel or a roller fitted into the surface of the operator console. The movement of the operating element causes the controller to selectively highlight information or commands represented on the display device. The highlighting reflects an operating state of the printing machine and may include symbols or information for prompting further actions by the operator. In keeping with the low dexterity requirements of the invention, the display of the commands are advanced sequentially by column or row on the display element. Once the desired information or the envisaged command has been reached and highlighted in the menu sequence by rotating the operating element forward or backward, the command can be initiated by actuating a command key.

The invention uses an operating element which can be moved continuously only in one dimension in order to call up one or more items of information or commands from a menu. The operating element, preferably a wheel or a cylindrical roller, can be actuated precisely by the operator wearing working gloves. When multiple command operations are performed, the type and meaning of the movements required by the operator remains the same, thus allowing low dexterity operation and simplified control decisions.

According to another aspect of the invention, in addition to a first operating element mounted for rotation about a single axis, a second operating element is arranged so that it rotates about an axis perpendicular to the first single axis. The two operating elements are then fitted in the operating console so that the first operating element rotates forward or backward and the second operating element rotates left or right. Thus, an operator easily and efficiently selects specific items of information or commands from a menu provided on the display device by merely rotating the first operating element forward or backward to sequence through the displayed items and then pressing the command key. To change a numerical value associated with a selected menu item highlighted on the display device, the operator then merely rotates the operating element forward or backward to increment the value up or down, respectively. The second operating element is rotated to provide additional command information. For example, the second operating element may function to combine or box a plurality of ink metering zones or damping solution metering zones into one region, whereupon the values associated with each of the selected items are simultaneously adjusted by rotating the first operating element either forward or backward as described above. The selected command operations represented on the display device are performed after the command initiation key on the control console has been pressed. The arrangement of two operating elements which can be rotated perpendicular to one another has the advantage that a pointer represented on the display device can be moved exactly in the horizontal (X) or vertical (Y) direction.

By appropriately selecting the size of an operating element and the amount of its rotation required to perform a command function (e.g., select the next command or information item, change the value of a selected menu item), the effort and time required to select and actuate a single command function or a series of command functions are minimized. For example, an operator can quickly scan through the menu of available commands, information and regions/zones to find and perform the desired command function.

BRIEF DESCRIPTION OF THE DRAWINGS

Other objects and advantages of the invention will become apparent upon reading the attached detailed description and upon reference to the drawings in which.

While the invention has been described in connection with certain preferred embodiments, it will be understood that there is no intention to limit the invention to the embodiments shown, but it is intended, on the contrary to cover the various alternative and equivalent constructions included within the spirit and scope of the appended claims.

DETAILED DESCRIPTION OF THE INVENTION

Figure 1:
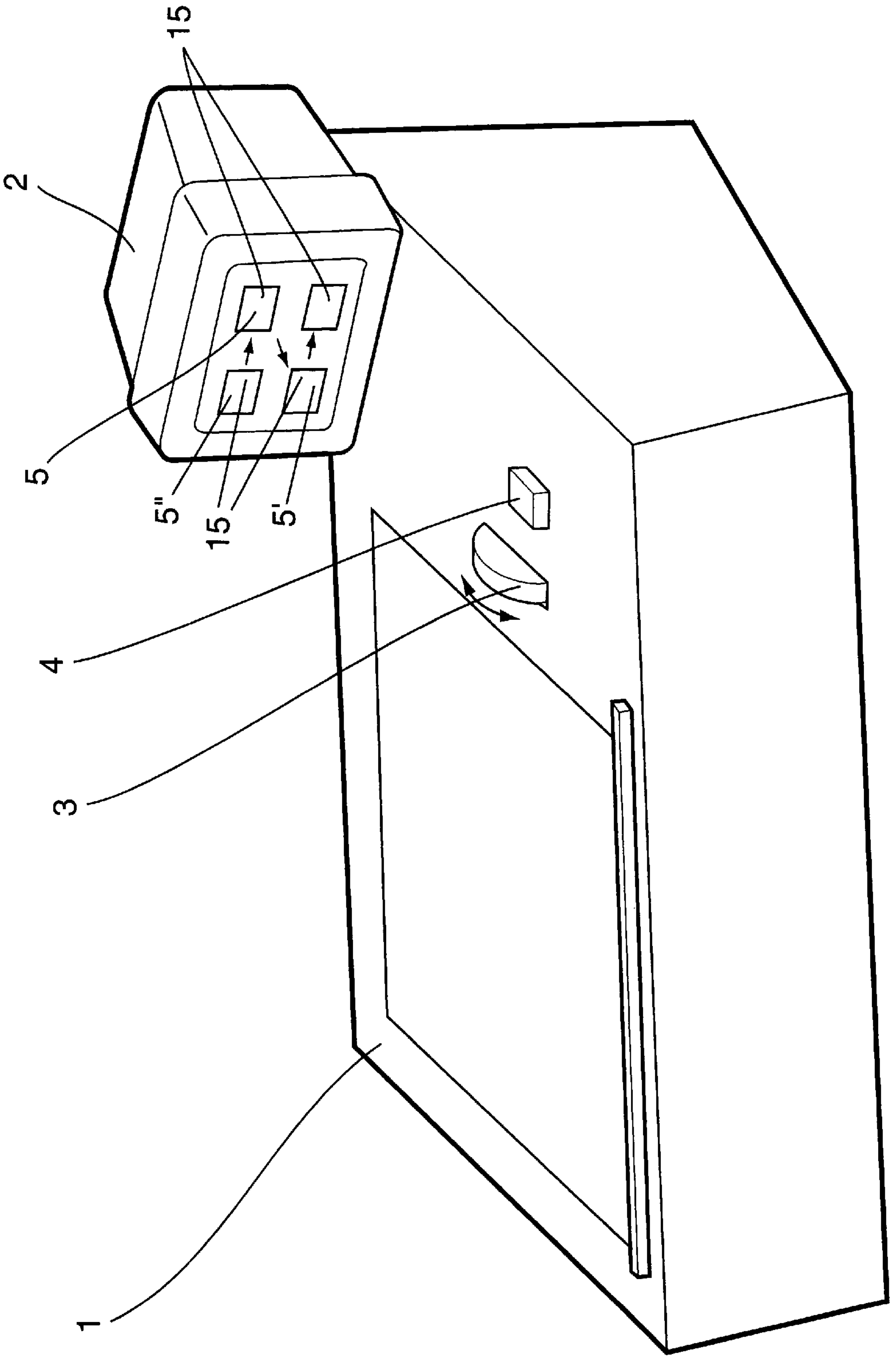
FIG. 1 illustrates an operating console for a printing machine that includes an operating element according to a first embodiment of the invention.

Turning now to the drawings, there is shown in FIG. 1 an operating console generally designated 1 of a printing machine. The operating console 1 has a surface which is inclined relative to the operator and on which a printed sheet can be laid for the purpose of visual assessment. The operating console 1 further has a display device 2 depicted as a monitor. Below the display device 2, an operating element 3 is fitted capable of rotating in the surface of the operating console 1 in the directions indicated by the double arrow. In accordance with the present invention, the operating element 3 is be preferably a wheel or a roller.

Menu items 15 are presented on the display device 2 and can be successively visually highlighted in accordance with a predetermined sequence by rotating the operating element 3 in one direction. By way of example, the particular menu item 5 located in the top right corner of the display device 2 is highlighted to indicate it is active. In accordance with this preferred embodiment of the invention, one of the menu items 15 is highlighted by sequencing through rows of the items from top to bottom, in a fashion resembling how the eye moves when reading a text.

This sequencing is accomplished by rotating the operating element 3 in the direction of the front edge of the operating console 1. To select the next menu item 15, the operating element 3 is rotated by a predetermined amount. This is represented on the display device 2 by highlighting the next menu item 5' if operating element 3 is rotated in the forward direction or highlighting the next menu item 5" if operating element 3 is rotated in the reverse direction, and returning menu item 5 to a normal display mode (i.e., not highlighted).

A command initiation push button 4 is mounted alongside operating element 3. When a desired menu item 5 is selected and thus highlighted, the operator presses the command initiation push button 4 causing the represented command function to be performed.

Figure 3:
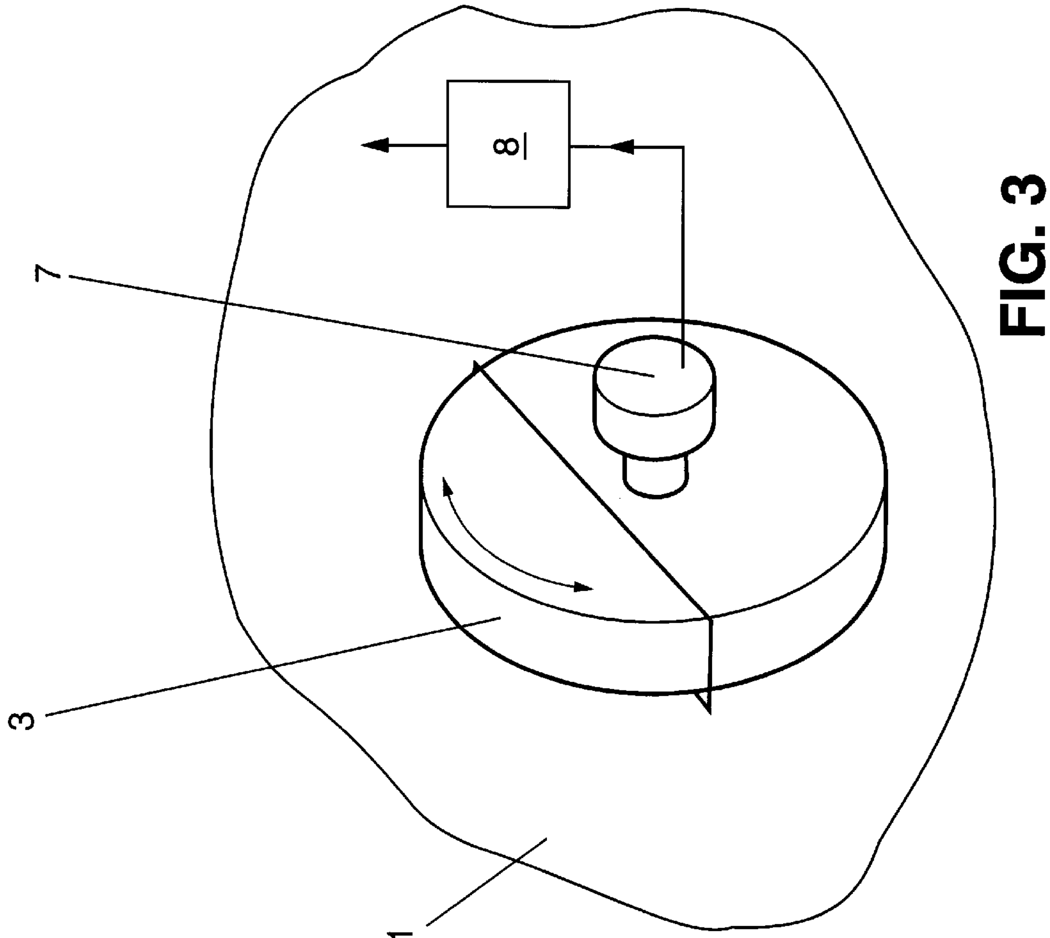
FIG. 3 is a highly schematic diagram of an operating element with an evaluation system according to either the first or second embodiments of the invention.

The element that senses the movement of the operating element 3 is located below the surface of the operating console 1 as shown in FIG. 3. A resolver 7, such as an incremental encoder, is connected to the operating element 3, to sense the direction and amount of the rotation of the operating element 3. The output of the resolver 7 is connected to an electronic evaluation system 8 which controls the display of menu items 5 in the manner previously described.

The command initiation push button 4 which, in the preferred embodiment, is a conventional push button actuated against a spring force.

Figure 4:
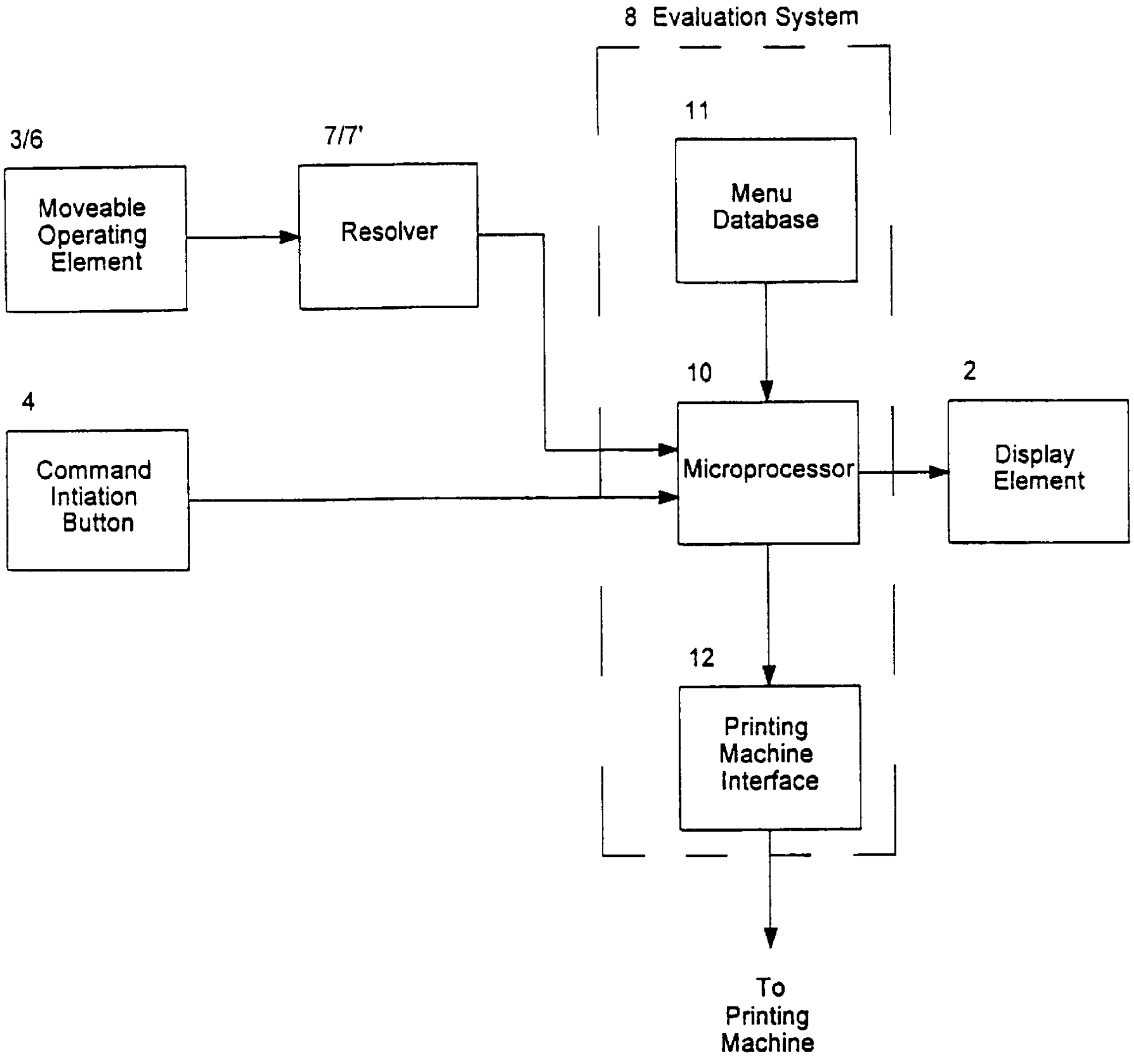
FIG. 4 is a block diagram of the control device according to the invention, which includes the operating element and the evaluation system of FIG. 3.

Referring now to FIG. 4, the evaluation system 8 comprises a microprocessor 10, a menu database 11, and a printing machine interface 12. In response to the moveable operating element 3, the resolver 7 sends a signal to the microprocessor 10 relaying the direction and amount of rotation of the moveable operating element 3. In response to this signal, the microprocessor 10 retrieves the next menu item 15 from the menu database 11, either in a forward or reverse direction. The microprocessor 10 then displays the previously selected menu item 5 according to the normal display mode, and highlights, on the display device 2, the newly selected menu item 5' if the moveable operating element was rotated in the forward direction or newly selected menu item 5" if the moveable operating element was rotated in the reverse direction. In a conventional manner, the microprocessor 10 senses when the command initiation button 4 is pressed, and then performs the function associated with the selected menu item 15 by sending an appropriate control message to the printing machine interface 12, which communicates with the printing machines in a known manner.

Figure 5:
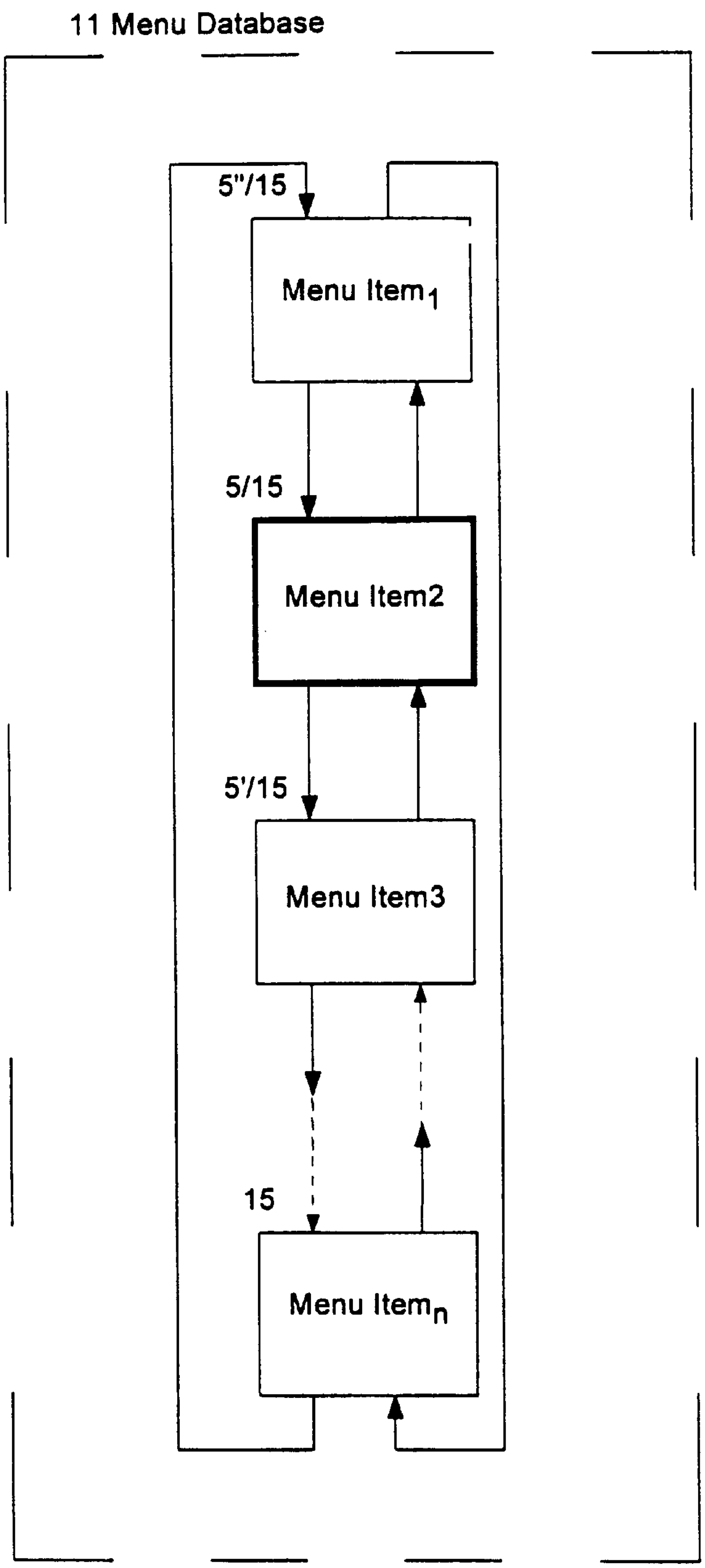
FIG. 5 is a flow diagram of a preferred embodiment of the structure of the menu database for retrieval of commands and information in a predetermined sequence corresponding to the order displayed and highlighted in response to the movement of a operating element.

The menu database 11 is structured in the preferred embodiment of the invention as a dual linked list which allows efficient retrieval of the next menu item 15 in the predetermined sequence. As represented in FIG. 5, the menu item 15 next in the forward direction after the currently selected menu item 5 is the menu item 5' immediately below it, or it would be the first menu item 15 if the last menu item 15 in the menu database 11 is currently selected. Similarly, the menu item 15 in the reverse direction next to the currently selected menu item 5 is the menu item 5" immediately above it, or it would be the last menu item 15 if the first menu item 15 in the menu database 11 was currently selected. Thus, if the menu database 11 contains a number n menu items 15, then for any selected menu item 5 stored in a position m, the next menu item 15 in the forward direction would be at position m+1 when m<n, or would be at position 1 when m=n; and the next menu item 15 in the reverse direction would be at position m−1 when 1<m, or would be at position n where m=1. As exemplified in FIG. 5, the selected menu item 5 is at position 2. Therefore, the next menu item 5' in the forward direction is found at position 3 (i.e., position 2+1) and the next menu item 5" in the reverse direction is found at position 1 (i.e., 2−1). Using this protocol, the microprocessor 10 can easily identify the next menu item 15 in either a forward or reverse direction from the menu database 11, in response to the input signals from the resolver.

Figure 2:
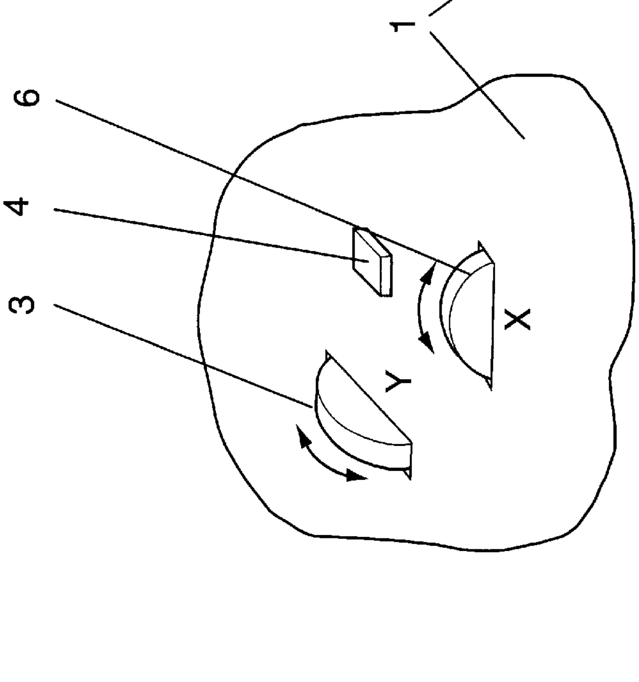
FIG. 2 illustrates an isolated portion of an operating console incorporating an alternative embodiment of the invention, in which two operating elements can be actuated in mutually perpendicular directions.

A second operating element 6 for rotation in the horizontal (X) direction can be mounted on the operating console 1, in addition to the operating element 3 for rotating in the vertical (Y) direction. A shown in FIG. 2, the axis of the operating element 6 is perpendicular to that of the operating element 3. Operating element 3 is used in to move a pointer or cursor and to select menu items 15 on the display device 2 in the vertical (Y) direction, while operating element 6 does so in the horizontal (X) direction. In keeping with the invention, however, it is essential that the two operating elements are actuated sequentially and not simultaneously. Thus, an operator can quickly perform command functions by rotating the operating elements 3, 6 in a coordinated manner.

A control device for a printing machine has been described which allows an operator of a printing machine who routinely wears gloves and performs his work on an inclined work surface to quickly and reliably control the printing machines.

What is claimed is:

1. A control device for a printing machine responding to a user, comprising:

moveable operating elements rotatable about mutually perpendicular axis for selecting commands in response to movements by the user;

resolvers for sensing the movement of the moveable operating elements; a command initiation button actuating the selected command in response to user input; a display for displaying the commands; and an evaluation system including: a menu database for storing a list of the commands which are accessed in a predetermined sequence; a printing machine interface communicating the actuated command to the printing machine; and a microprocessor for (1) retrieving a command from the menu database and indicating on the display the command selected in response to one or more of the resolvers, and (2) sending the selected command to the printing machine interface in response to actuating of the command initiation button; wherein the microprocessor selects the next command either forward or backward in the predetermined sequence in response to one or more of the resolvers.

2. The control device of claim 1, further comprising:

an operating console; wherein the first and second moveable operating elements are mounted upon the operating console.

3. The control device of claim 1, wherein the microprocessor sends adjustment data corresponding to the actuated command to the printing interface in response to the second resolver.

4. The control device of claim 1, wherein a first one of the resolvers controls selection of commands on the display along an axis that is the same as that about which the first resolver rotates and a second resolver controls the selection of commands on the display along an axis that is the same as that about which the second resolver rotates.

* * * * *